(12) United States Patent
Arteta Unanua et al.

(10) Patent No.: US 11,603,942 B2
(45) Date of Patent: Mar. 14, 2023

(54) VALVE ASSEMBLY AND HOUSING COMPRISING THE SAME

(71) Applicant: ILLINOIS TOOL WORKS INC., Glenview, IL (US)

(72) Inventors: Javier Arteta Unanua, Puenta la Reina Gares (ES); Carlos Colomer, Barcelona (ES); Francisco Cuervas Florido, Rubi (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 4 days.

(21) Appl. No.: 17/392,768

(22) Filed: Aug. 3, 2021

(65) Prior Publication Data
US 2022/0042613 A1 Feb. 10, 2022

(30) Foreign Application Priority Data

Aug. 6, 2020 (EP) ..................... 20382732
Jul. 13, 2021 (EP) ..................... 21185352

(51) Int. Cl.
*F16K 17/36* (2006.01)
*H01M 50/691* (2021.01)
*H01M 10/613* (2014.01)
*H01M 10/6567* (2014.01)

(52) U.S. Cl.
CPC .......... *F16K 17/36* (2013.01); *H01M 50/691* (2021.01); *H01M 10/613* (2015.04); *H01M 10/6567* (2015.04)

(58) Field of Classification Search
CPC ......... F16K 17/36; F16K 17/383; F16K 17/40
See application file for complete search history.

(56) References Cited

U.S. PATENT DOCUMENTS

| 6,719,268 | B2 * | 4/2004 | Fukano | F16K 31/0672 |
| | | | | 251/129.17 |
| 2013/0313462 | A1 * | 11/2013 | Falesnik | F16K 3/186 |
| | | | | 251/328 |
| 2014/0239208 | A1 | 8/2014 | Thyroff | |
| 2014/0332085 | A1 | 11/2014 | Grace | |
| 2017/0332566 | A1 | 11/2017 | Emory | |

FOREIGN PATENT DOCUMENTS

DE 102013208979 A1 11/2014

OTHER PUBLICATIONS

Original and Translation of WO 2016146216; Kochanski, André; Kirscht, Alexander; Breitkopf, Aaron; Engel, Philipp; Sep. 22, 2016.*

\* cited by examiner

*Primary Examiner* — Paul J Gray
(74) *Attorney, Agent, or Firm* — Thompson Hine LLP (57) ABSTRACT

A valve assembly includes a first part mountable to a fluid port of a panel and having a first opening for ingress of fluid into the first part from a first side of the panel, and a second opening for egress of fluid out of the first part through the fluid port to a second side of the panel; a second part within the first part for sealing the second opening when in a first position, a deformable member, and a resilient member biased to move the second part to a second position, to provide a fluid flow path from the first opening to the second. In an initial state, the deformable member retains the second part in the first position. Upon contacting liquid within the first part, at least part of the deformable member deforms to enable the resilient member to move the second part to the second position.

17 Claims, 6 Drawing Sheets

VALVE ASSEMBLY AND HOUSING COMPRISING THE SAME

TECHNICAL FIELD

This invention relates to a valve assembly, a housing comprising a valve assembly, and a battery pack comprising a valve assembly.

BACKGROUND

In housings where liquid-sensitive components need to be cooled, such as an electric vehicle battery pack, coolant pipes containing coolant liquid are often passed from a pump on a "wet" side of the housing to a "dry" side of the housing. The dry side of the housing is typically where liquid-sensitive components are contained, such as battery cells and a battery management control system. In the event of coolant liquid leaking from a coolant pipe into the battery housing, accumulation of coolant liquid can pose a significant fire risk and so it is important to remove the coolant liquid from the internal compartment of the housing as soon as possible.

It is known to use a gel to absorb coolant water that has leaked from coolant pipes. However, such gels do not remove the water from the housing and as such, there is still significant fire risk due to the presence of water in the dry side of the battery pack.

Existing valves which are typically used to drain a housing remain open and thus do not prevent fluid from entering the dry side of the battery pack.

The present invention seeks to address at least some of these issues.

BRIEF SUMMARY OF THE DISCLOSURE

Viewed from a first aspect, the present invention provides a valve assembly comprising a first part mountable to a fluid port of a panel and comprising a first opening for allowing ingress of fluid into the first part from a first side of the panel, and a second opening for allowing egress of fluid out of the first part through the fluid port to a second side of the panel; a second part disposed within the first part and configured to seal the second opening when in a first position within the first part, a deformable member disposed within the first part, and a resilient member biased to move the second part to a second position within the first part, so as to provide a fluid flow path from the first opening to the second opening. When in an initial state, the deformable member is arranged to retain the second part in the first position, and upon contacting a liquid within the first part, at least a portion of the deformable member is configured to deform, so as to enable the resilient member to move the second part to the second position.

Thus, the present invention provides a self-activating drain valve that can drain liquid from one side of a panel without user intervention and without the need to separately detect the liquid and inform a user.

The deformable member may comprise a synthetic polymer, such as, for example, a polyvinyl alcohol (PVA, PVOH). The deformable member may comprise a foam structure. In some cases, the deformable member comprises, as an example, a polyvinyl alcohol foam. This advantageously reacts with water and/or a water and glycol mixture, a suitable coolant liquid, in a desirable manner.

The first part may comprise a cap or closure, which may be fire-retardant and/or which may receive the deformable member. The deformable member may be configured to soften or at least partially dissolve upon contacting the liquid. This advantageously provides a deformable member which changes its material properties upon reacting with the coolant liquid so as to deform in the desired manner.

The deformable member may be disposed between the first part and the second part. The resilient member may be biased to move the second part towards the deformable member. A biasing member or a resilient member are examples of biasing means. A resilient biased member is a further example of biasing means. A compression spring is an example of a resilient member.

The first part may comprise a bayonet coupling adapted to attachingly engage with the fluid port of the panel.

The first part may comprise a resiliently deformable arm arranged to engage a lip of the panel on the first side of the panel so as to secure the first part within the fluid port. This advantageously only requires the user to press the valve assembly into the fluid port to secure the valve assembly to the panel. A resilient barb is an example of a resiliently deformable arm.

The valve assembly may comprise a first resiliently deformable member, preferably comprising two sealing lips, secured to the first part, preferably on a flange-like portion of the first part, and arranged to abut the second side of the panel. In use, the first resiliently deformable member and the resiliently deformable arm may secure the panel therebetween.

The first resiliently deformable sealing member may be operably encased by a cover member that is configured to protect the first resiliently deformable sealing member from external elements.

The valve assembly may comprise a second resiliently deformable sealing member attached to the first part and arranged to abut the second part when the second part is in the first position, so as to seal the second opening of the first part. A gasket, a U-shaped seal, V-shaped seal and an O-ring are all examples of resiliently deformable members.

The first resiliently deformable sealing member and the second resiliently deformable sealing member may be integrally formed with one another. This advantageously allows for the first and second resiliently deformable sealing members to be over-moulded to the first part, which provides a simpler process for manufacturing the valve assembly. Further, when in use, the first resiliently deformable sealing member and the bayonet coupling may sealingly engage the panel therebetween.

The valve assembly may comprise a gasket attached to the second part. When the second part is in the first position, the gasket may be arranged to seal the second opening.

Viewed from a further independent aspect, the present invention provides a housing comprising a panel defining an internal volume and an external volume and having a fluid port formed therein, and a valve assembly as described above secured within the fluid port. This advantageously provides a housing with a self-activating valve that activates automatically upon accumulation of liquid, within the housing.

Viewed from a further independent aspect, the present invention provides an electrical vehicle battery pack comprising a panel defining an internal volume and an external volume and having a fluid port formed therein, and a valve assembly as described above secured within the fluid port. This advantageously provides an electrical vehicle battery pack with improved safety, as the valve will automatically activate once coolant liquid within the housing comes into contact with the deformable member in the valve.

BRIEF DESCRIPTION OF THE DRAWINGS

Exemplary valve assemblies are further described hereinafter with reference to the accompanying drawings, in which.

DETAILED DESCRIPTION

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

Figure 1A:
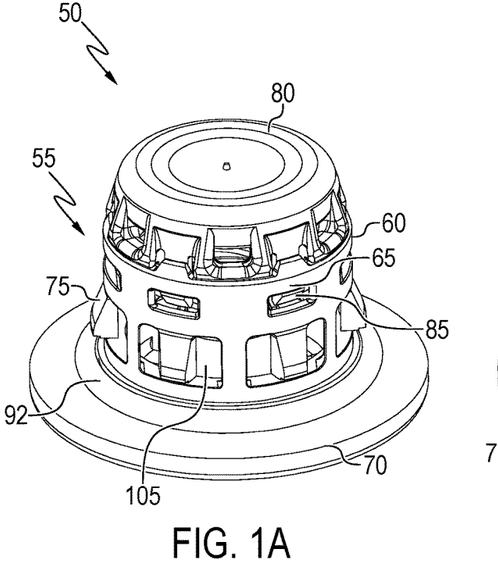
FIGS. 1A & 1B illustrate perspective views of an exemplary drain valve.
Figure 1B:
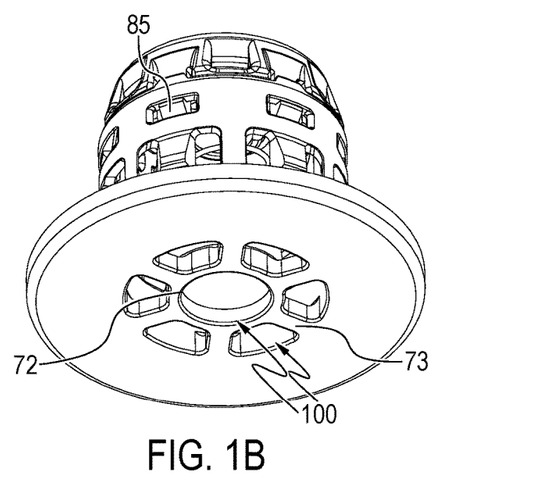

FIGS. 1A & 1B illustrate perspective views of an exemplary drain valve 50 with a first part 55 and a second part 105 contained therein. The first part 55 has a substantially circular body 60, a cap 80 secured to a first end of the body 60 and a skirt 70 at a second end of the body 60. The cap 80 has a plurality of arms 85 extending towards the body 60 and each of the arms 85 engages with a respective cross-member 65 of the body 60 formed by openings within the body 60. The engagement between arms 85 and cross-members 65 are mechanical snap-fit joints that provide a simple and convenient way to secure the cap 80 to the body 60. However, it would be apparent that other types of mechanical fixation would be suitable for securing the cap 80 to the body 60, including releasable and/or temporary attachments such as screws of press-fit joints. The body 60 also includes a series of openings 90 which allow a coolant liquid, such as water, to enter a cavity 95 within the body 60 (see also FIG. 2A). The skirt 70 has a series of openings 100 which allow liquid to drain from the cavity 95. In some cases, the cap 80 comprises a fire-retardant material. In some cases, the body 60 and/or the second part 105 and/or cap 80 comprise a plastic material.

Figure 2A:
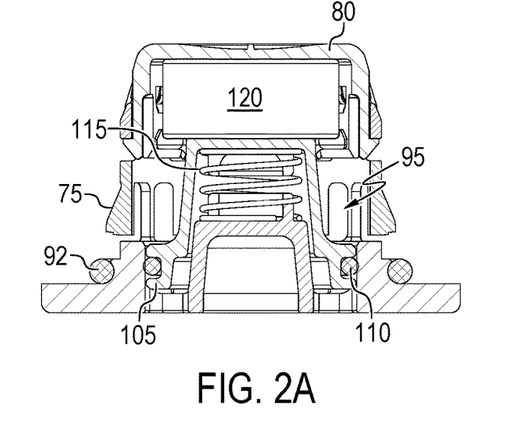
FIGS. 2A & 2B illustrate cross-sectional views of the drain valve of FIGS. 1A-1B.
Figure 2B:
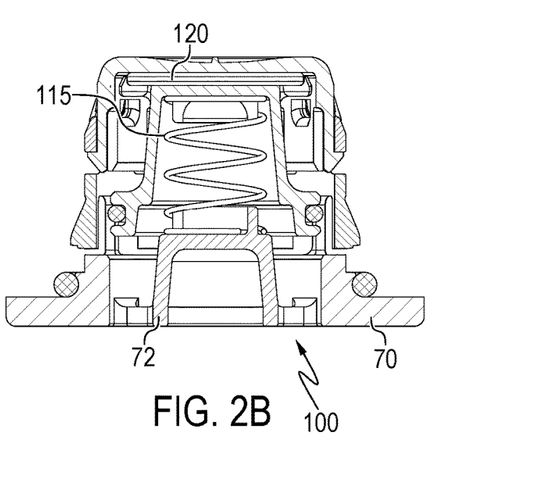

FIGS. 2A & 2B illustrate cross-sectional views of the drain valve 50 of FIGS. 1A and 1B and illustrate the deformable disc 120 disposed within the cavity 95 and abutting the cap 80 when the second part 105 is held in a first position illustrated in FIG. 2A. In the first position, the deformable disk 120 is an initial dry state and resists the compressive force of the stainless steel compression spring 115 which is biased to push the second part 105 towards the cap 80. While the spring 115 is illustrated as being disposed between an inner surface of the second part 105 and a central column 72 secured to the skirt 70 by a series of connecting struts 73, it would be apparent this was not essential and that other arrangements may be suitable for use with the present drain valve 50. Similarly, while a compression spring 115 is disclosed, it would be apparent that this was merely one example and that other components would be suitable for biasing the second part 105 towards the cap 80.

A series of resilient barbs 75 extending from the body 60 are also provided. The barbs 75 are arranged to engage with an elastomeric ring 92 arranged on the skirt 70. The barbs 75 and ring 92 define a space for receiving a lip 19 of a panel 12 to secure the drain valve 50 to the panel (see also FIG. 3A). In use, the ring 92 provides a seal between the panel 12 and the skirt 70.

In one example, the deformable disc 120 reacts with a mixture of glycol and water, an exemplary coolant liquid. This reaction causes the disc 120 to at least partially dissolve, which weakens the disc 120 in the desired manner and enables the disc 120 to deform due to the compressive force of the spring 115. While water and glycol is provided as an exemplary coolant liquid and polyvinyl alcohol is provided as an exemplary composition of disc 120, it would be apparent that these were merely examples, and other fluids (liquid, gas) or solids (e.g. powder) suitable for cooling, and compositions of the deformable disc 120 would be suitable for use with the present drain valve 50.

As illustrated in FIG. 2A, when the disc 120 is in an initial "dry" state, the second part 105 is retained in a first position at the second end of the body 60 and seals the second opening 100 by compressing a gasket 110 against an inner surface of the skirt 80. In the illustrated embodiment, the second part 105 has a substantially cylindrical profile with an open end at the first end and a closed end at a second end opposed to the first end and the gasket 110 is an O-ring secured within a recess 107 formed in the side wall of the second part 105. However, it would be apparent a cylindrical profile was merely an exemplary profile and that other profiles in combination with an appropriately-shaped gasket 110 would be suitable for use with the present drain valve 50. Similarly, while an O-ring has been described, it would be apparent other profiles would be suitable for sealing the second openings 100. The open end of the second part 105 is arranged to receive the compression spring 115 and a portion of the central column 72. The closed end is arranged to abut the deformable disc 120 and applies a compressive force onto the disc 120 due to the compression spring 115.

Figure 3A:
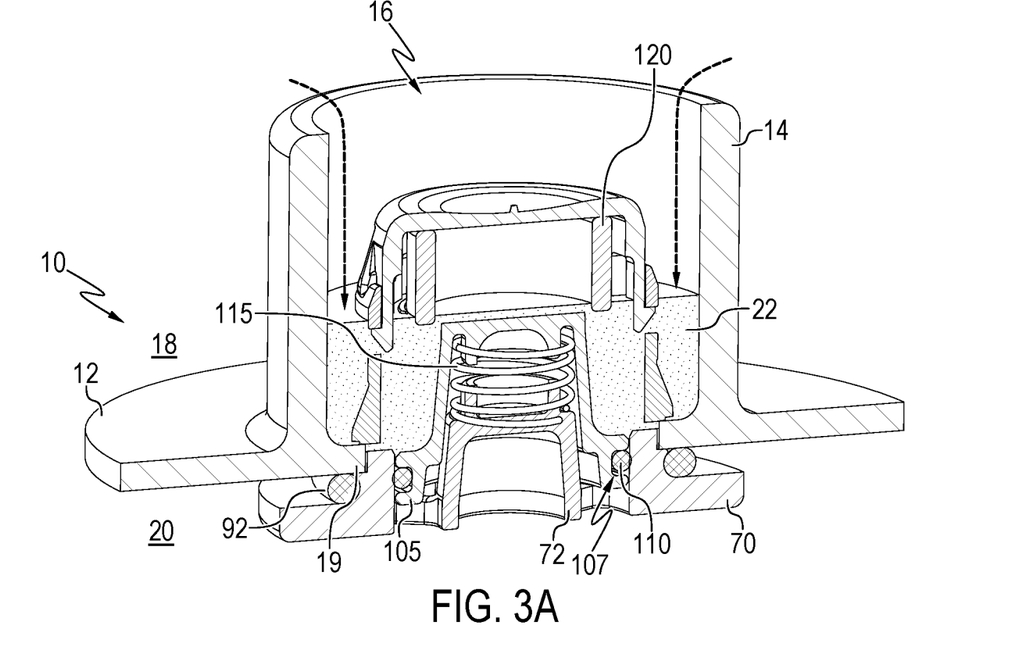
FIG. 3A illustrates an exemplary housing comprising the drain valve of FIGS. 1A-1B in a first configuration, which prevents liquid from passing through the drain valve.

FIG. 3A illustrates an exemplary housing 10 with a drain valve 50 secured in a panel 12 of the housing 10. The panel 12 defines internal 18 and outer 20 volumes of the housing 10 and battery cells of an electric vehicle battery pack (not shown) are present in the inner volume 18 along with coolant pipes (not shown) to cool the battery cells. A collar 14 is also provided in the housing 10 which defines an inlet 16 for directing coolant 22 towards the drain valve 50. As coolant 22 enters the collar 14, it will pass through the first openings 90 of the drain valve 50 and accumulate within the cavity 95 of the body 60 as the second openings 100 are sealed due to the second part 105 compressing O-ring 110 against the inner surface of the skirt 70. Once the coolant within the collar 14 reaches a critical level, it will contact the deformable disc 120 and begin to dissolve the disc 120. As the disc 120 dissolves, it will lose structural integrity and soften as the material making up the disc 120 dissolves into the coolant 22. As the disc 120 dissolves, it will have a diminishing profile which provides less resistance to the compressive force exerted by the compression spring 115. As more coolant accumulates in the drain valve 50, more of the deformable disc 120 will dissolve and release the second part 105.

Figure 3B:
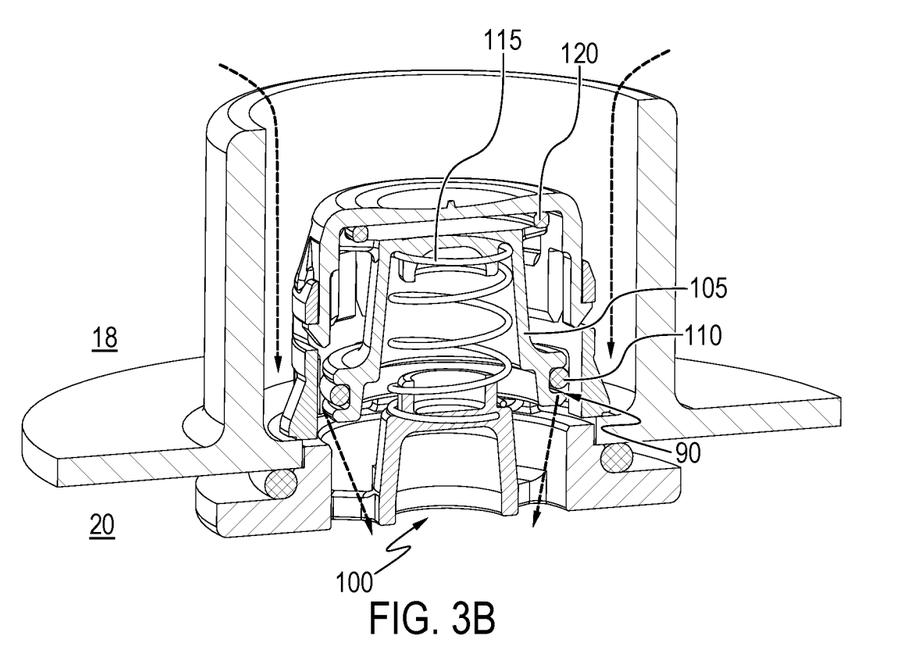
FIG. 3B illustrates the housing where the drain valve is in a second configuration, which allows liquid to pass through the drain valve and out of the housing.

When the disc 120 has been degraded sufficiently such that it is unable to resist the compressive force of the compression spring 115, the disc 120 is in a second "wet" state (see also FIGS. 2B and 3B). When the disc 120 is in the wet state, the compression spring 115 can move the second part 105 towards the cap 80 which opens the second openings 100 of the first part 50. In this second configuration, the gasket 110 is spaced form the skirt 70 which provides a fluid flow path between the first openings 90 and the second openings 100. The coolant liquid 22 is thus able to drain from the inner volume 18 of the housing 10 and the risk of damaging any liquid-sensitive components within the housing 10 are reduced. While a collar 14 provides a convenient way to direct coolant towards the drain valve 50, it would be apparent a collar 14 was not essential in any housing 10 comprising a drain valve 50. It would also be apparent that it was not essential for the disc 120 to completely dissolve for the second part 105 to be moved to the second position. In some cases, the disc 120 may partially dissolve such that structural integrity of the disc 120 is reduced sufficiently for the compression spring 115 to crush the remaining disc 120 material to move the second part 105 to the second position.

Figure 4A:
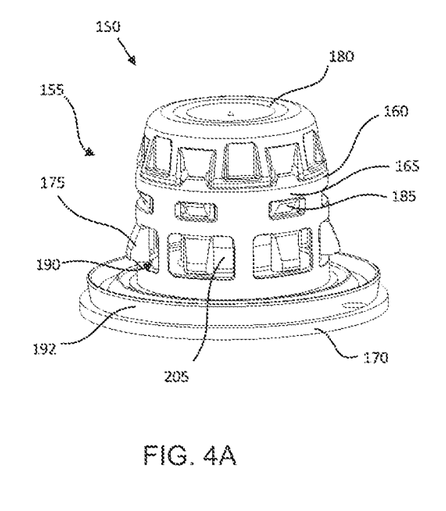
FIGS. 4A & 4B illustrate perspective views of an alternative drain valve.
Figure 4B:
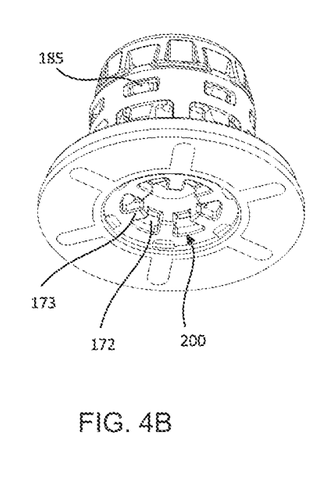

FIGS. 4A & 4B illustrate perspective views of an alternative drain valve 150. The drain valve 150 is similar to drain valve 50 and includes a first part 155 having a substantially circular body 160, a cap 180 at a first end of the body 160 and a skirt 170 at a second end of the body 160, and a second part 205. The cap 180 has a plurality of arms 185 extending towards the skirt 170 and each of the arms 185 engages with a respective cross-member 165 of the body 160 formed by openings within the body 160. The engagement between arms 185 and cross-members 165 are mechanical snap-fit joints that provide a simple and convenient way to secure the cap 180 to the body 160. However, it would be apparent that other types of mechanical fixation would be suitable, including releasable and/or temporary attachments such as screws of press-fit joints. The body 160 also includes a series of openings 190 which allow a coolant liquid, such as water, to enter a cavity 195 within the body 160 (see also FIG. 5A). The skirt 170 has a series of openings 200 which allow liquid to drain from the cavity 195.

Figure 5A:
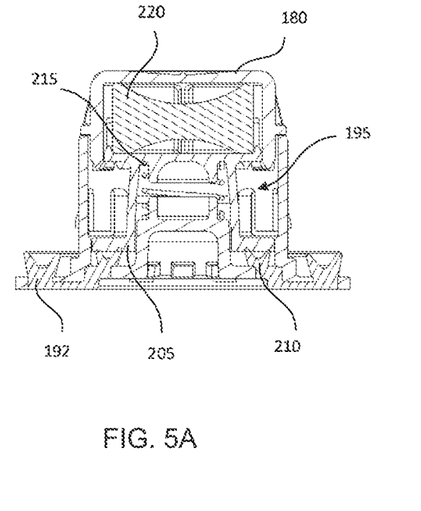
FIGS. 5A & 5B illustrate cross-sectional views of the drain valve of FIGS. 4A-4B.
Figure 5B:
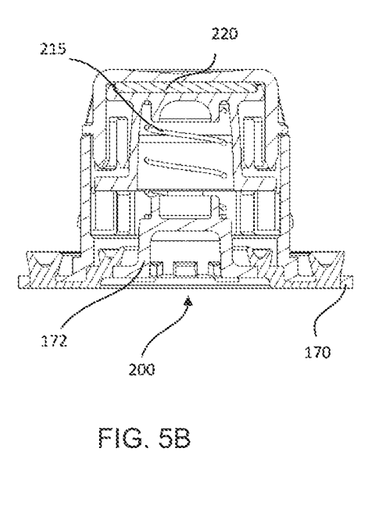

FIGS. 5A & 5B illustrate cross-sectional views of the drain valve 150 of FIGS. 4A and 4B and illustrate the deformable disc 220 disposed within the cavity 195 and abutting the cap 180 when the second part 205 is held in a first position illustrated in FIG. 5A. In the first position, the deformable disk 220 is an initial dry state which provides resilience against the compressive force of the compression spring 215 which is biased to push the second part 205 towards the cap 80. While the spring 215 is illustrated as being disposed between an inner surface of the second part 205 and a central column 172 secured to the skirt 170 by a series of connecting struts 173, it would be apparent this was not essential and that other arrangements may be suitable for use with the present drain valve 150. Similarly, while a compression spring 215 is disclosed, it would be apparent that this was merely one example and that other components suitable for biasing the second part 205 towards the cap 180 would be suitable.

A series of resilient barbs 175 extending from the body 160 are also provided. The barbs 175 are arranged to engage with a first gasket 192 arranged on the skirt 170. One difference between the drain valve 150 and drain valve 50 is the first gasket 192 and second gasket 210 are integrally formed with one another as a single component that is over-moulded over the body 160 which is made of a first plastic material. The first gasket 192 and second gasket 210 are both illustrated as V-shaped structures that circumscribe the body 160. However, it would be apparent that neither of the first 192 or second 210 gasket requires a V-shape. In some cases, the first 192 and/or second 210 gasket may comprise an O-ring to abut the panel 14 and seal the second openings 200 respectively. The first gasket 195 and arms 175 provide a space for receiving a lip 39 of a panel 32 and provide a convenient method of securing the drain valve 150 to the panel 32 in a similar manner to drain valve 50 (see also FIG. 6A). In some cases, the first 192 and/or second 210 gasket may comprise a thermoplastic elastomeric material.

In drain valve 150, the deformable disc 220 reacts with a mixture of glycol and water. This reaction causes the deformable disc 220 to at least partially dissolve when water contacts the surface of the disc 220, which weakens the disc 220 in the desired manner and enables the disc 220 to deform due to the compressive force of the spring 115. While water and glycol is provided as an exemplary coolant liquid and polyvinyl alcohol is provided as an exemplary composition of disc 220, it would be apparent that these were merely examples, and other coolant liquids and compositions of the deformable disc 220 would be suitable for use with the present drain valve 150. Similarly, it is not essential for the deformable disc 120 to have the same composition as disc 220. Similarly, while disc 120 is illustrated as a hollow cylinder having opposed closed ends (see FIG. 3A) and disc 220 is illustrated as a solid cylinder with opposed convex surfaces, it would be apparent that neither profile was essential to the function of the drain valve 50,150 and that other shapes would be suitable. Similarly, while the disc 120 and disc 220 are described as being weakened by partial dissolution, it would be apparent that the deformable disc 120, 220 may comprise a material whose material properties, such as stiffness, change upon contact with liquid. This would provide an alternative or additional method of weakening the disc 120, 220 in the desired manner.

As illustrated in FIG. 5A, when the disc 220 is in an initial "dry" state, the second part 105 is retained in a first position at the second end of the body 160 and a base 207 of the second part 105 presses against the second gasket 210 to seal the second openings 200. In the illustrated embodiment, the second part 205 has a substantially cylindrical profile with an open end at the first end and a closed end at a second end opposed to the first end. However, it would be apparent a cylindrical profile was merely an exemplary profile and that other profiles could be used in combination with the second gasket 210. The open end of the second part 205 is arranged to receive the compression spring 215 and a portion of the central column 172 in a similar manner to that described in relation to drain valve 50. The closed end is arranged to abut the deformable disc 220 and applies a compressive force onto the disc 220 due to the compression spring 215.

Figure 6A:
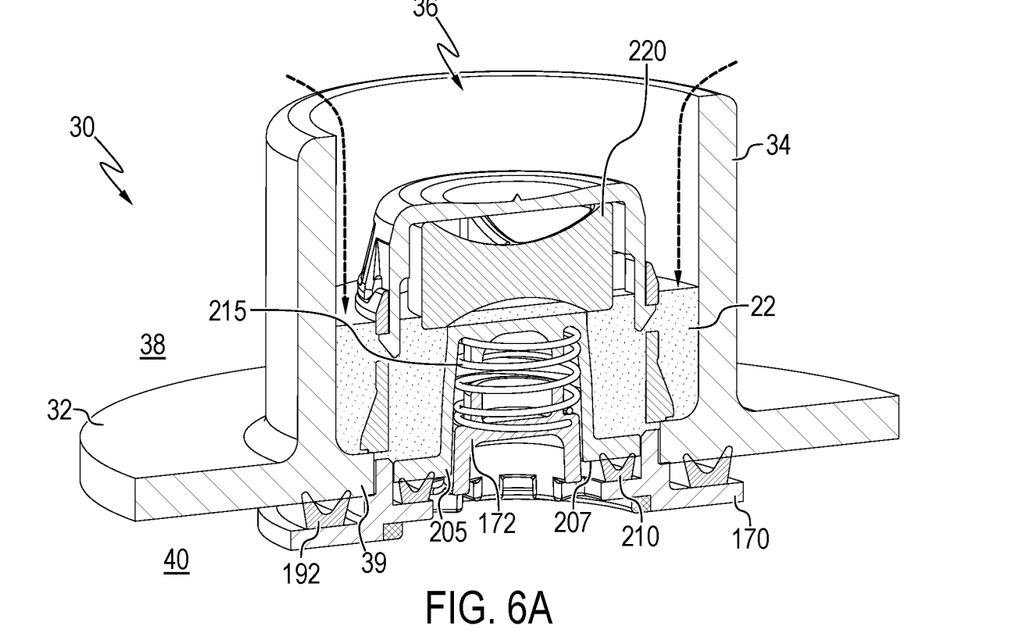
FIG. 6A illustrates an alternative housing comprising the drain valve of FIG. 4 in a first configuration, which prevents liquid from passing through the drain valve.

FIG. 6A illustrates an exemplary housing 30 comprising the drain valve 150 of FIGS. 4A & 4B in a first configuration which prevents liquid from passing through the drain valve 150. The housing 30 comprises a panel 32 which defines internal 38 and outer 40 volumes of the housing 30. The liquid-sensitive components of an electric vehicle battery pack (not shown) are present in the inner volume 38 along with a portion of a coolant system (not shown). When coolant escapes from the coolant system, it accumulates in the housing 30. A collar 34 may also be provided in the housing 10 so as to define an inlet 36 for directing coolant 22 towards the drain valve 150. As coolant 22 enters the collar 34, it will pass through the first openings 190 formed in the body 160 of the drain valve 150 and will accumulate within the cavity 195 of the body 160 as the second openings 200 are sealed by the second part 205 abutting the second gasket 210. Once the coolant within the collar 34 reaches a critical level, it will contact the deformable disc 220 and begin to dissolve the disc 220. As the disc 220 dissolves, it will lose structural integrity and soften as the material making up the disc 220 dissolves into the coolant 22. As the disc 220 dissolves, it will have a diminishing profile which provides less resistance to the compressive force exerted by the compression spring 215. By selecting a convex profile, it is possible to control the rate at which the second part 205 is displaced, as more material needs to be dissolved for a given displacement of the second part 205.

Figure 6B:
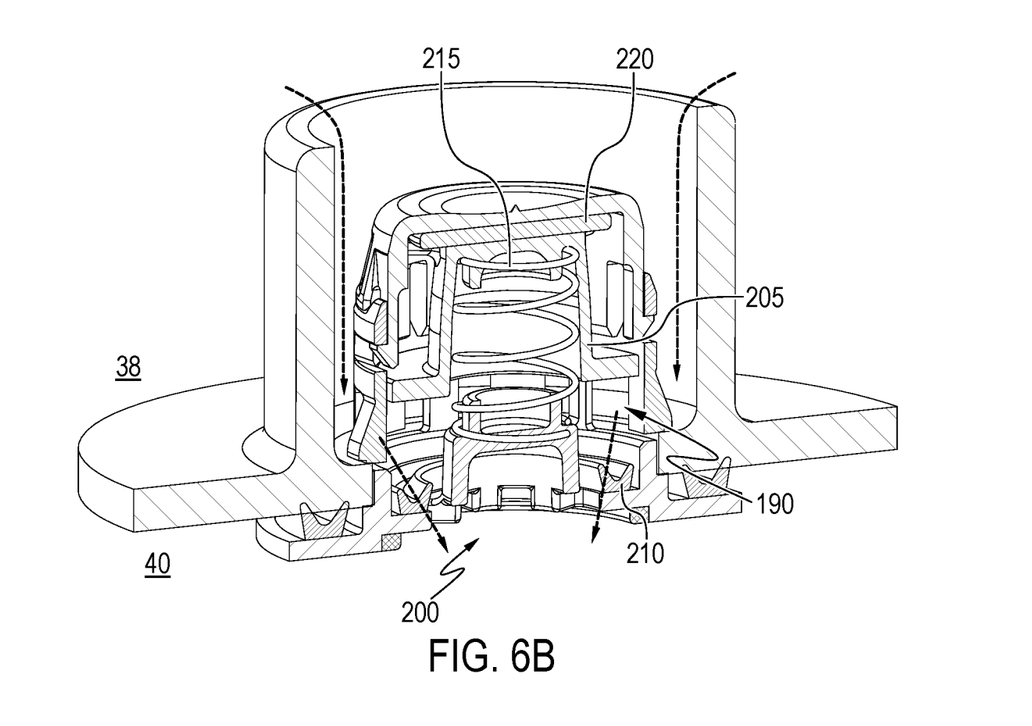
FIG. 6B illustrates the housing where the drain valve is in a second configuration, which allows liquid to pass through the drain valve and out of the housing.

When the resistance of the disc 220 is insufficient to resist the compressive force of the compression spring 215, the disc 220 is in a second wet state (see also FIGS. 5B and 6B). When the disc 220 is in the wet state, the compression spring 215 can move the second part 205 towards the cap 180 which moves the base 207 away from the second gasket 210 and breaks the seal in the second openings 200 to provide a fluid flow path between the first openings 190 and the second openings 200. The coolant liquid 22 is thus able to drain from the inner volume 38 of the housing 30 and the risk of damaging any liquid-sensitive components within the housing 30 are reduced. While a collar 34 is provided as a convenient method of directing coolant towards the drain valve 150, it would be apparent a collar 34 was not essential in any housing 30 comprising a drain valve 150. It would also be apparent that it was not essential for the disc 220 to completely dissolve for the second part 205 to be moved to the second position. In some cases, the structural integrity of the disc 220 may be sufficiently reduced such that the compression spring 215 may crush the remaining disc 220 material to move the second part 205 to the second position.

An example embodiment of yet another alternative drain valve 250 utilising a different arrangement of parts is illustrated in FIGS. 7A-7B, 8A-8C and 9, although, the basic mechanism and function of the alternative valve assembly 250 is alike to the mechanism and function described for the example embodiments shown in FIGS. 1A-1B (drain valve 50) and FIGS. 4A-4B (drain valve 150).

Figure 7A:
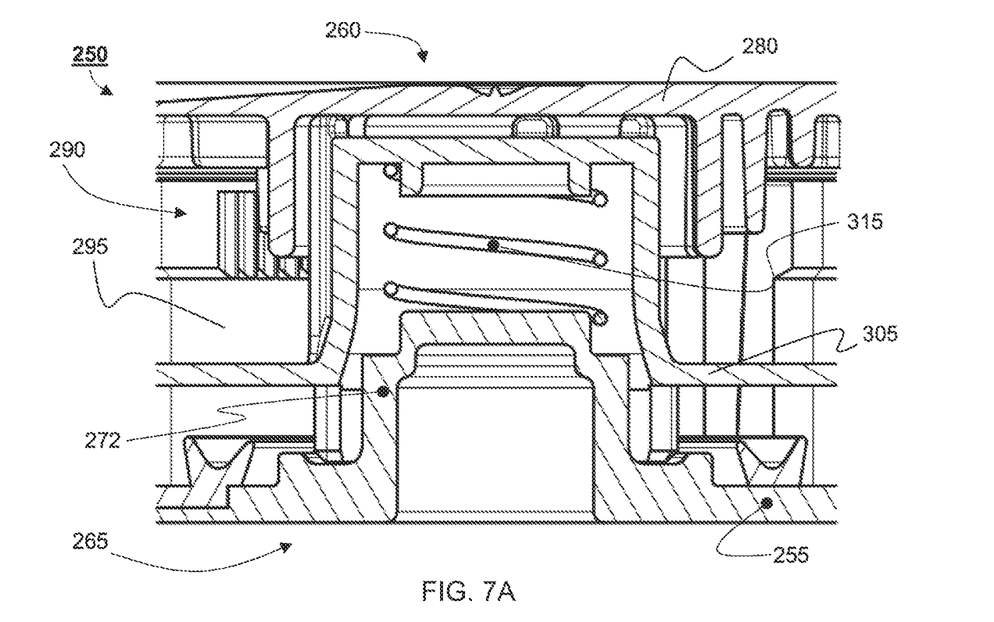
FIGS. 7A & 7B illustrate cross-sectional views of another alternative drain valve mechanism, when the second part is, per FIG. 7A, in the first position and, per FIG. 7B, in the second position.
Figure 7B:
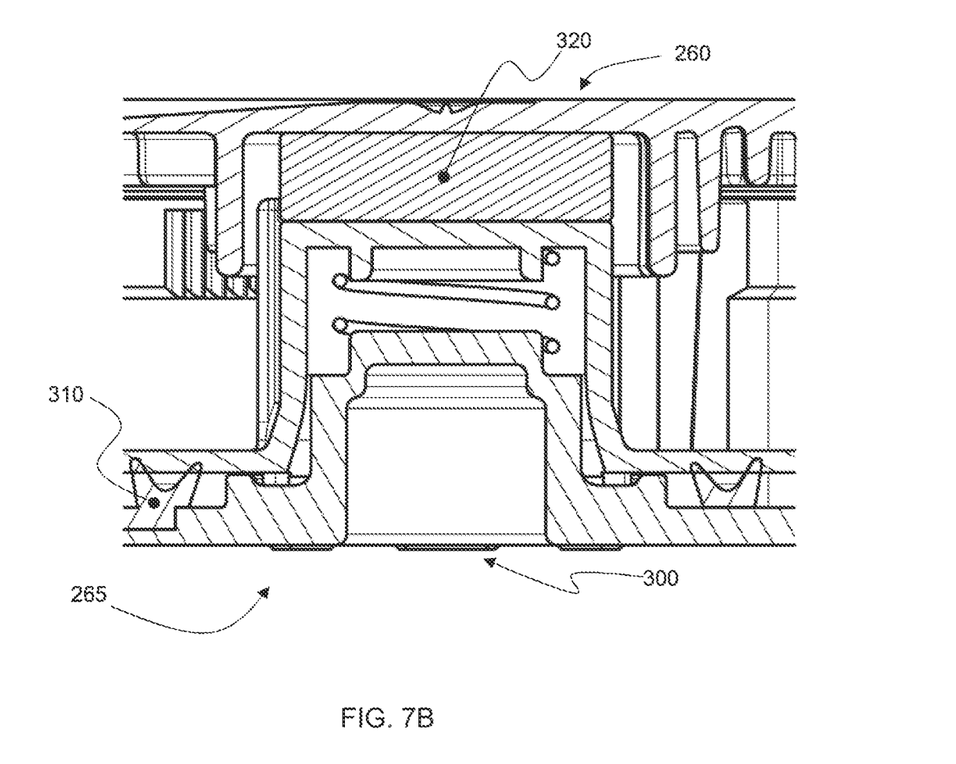

FIGS. 7A and 7B illustrate respective cross-sectional views of the exemplary drain valve 250 with a first part 255 and a second part 305 contained therein. As with the other example embodiments 50, 150, the first part 255 has a substantially circular body and a cap 280 secured to an upper end 260 of the body, e.g. via a bayonet coupling (see example in FIG. 9) provided at the upper end of the body of the first part 255. The body also includes a series of first openings 290 which allow a coolant liquid, such as water, to enter a cavity 295 within the body. A lower end 265 of the body has a series of second openings 300 (not shown) which allow liquid to drain from the cavity 295. As with the previous example embodiments, the cap 280 may comprise a fire-retardant material, and the body and/or the second part 305 and/or cap 280 may comprise a plastic material.

A deformable disc 320 is disposed within the cavity 295 and abutting a lower surface of the cap 280 when the second part 305 is held in a first position as illustrated in FIG. 7A. In the first position, the deformable disk 320 is an initial dry state and resists the compressive force of the stainless steel compression spring 315 which is biased to push the second part 305 towards the cap 280. While the spring 315 is illustrated as being disposed between an inner surface of the second part 305 and a central column 272 provided to the lower end 265, it would be apparent this was not essential and that other arrangements may be suitable for use with the present drain valve 250. Similarly, while a compression spring 315 is disclosed, it would be apparent that this was merely one example and that other components would be suitable for biasing the second part 305 towards the cap 280 and/or towards the upper end 160 of the body.

Figure 8A:
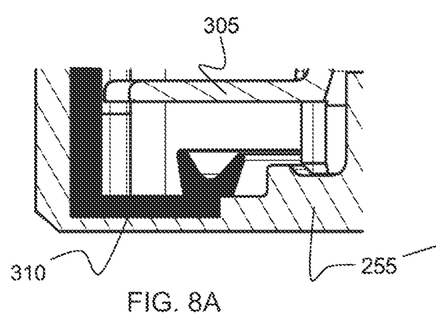
FIGS. 8A-8C illustrate cross-sectional "close-up" views of the drain valve of FIGS. 7A-7B.
Figure 8B:
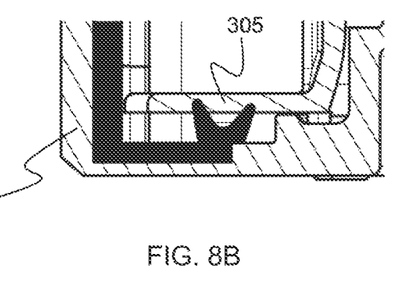

When the disc 320 is in its initial "dry" state, the second part 305 is retained in the first position towards the lower end 265 of the body and thus, seals the second openings 300 by compressing a second seal member 310 against an inner surface of the lower end 265 of the body (see FIG. 8A). When the second part is in its second position towards the upper end 260 of the body, a space is formed between the second part 305 and the second seal member 310 allowing any fluid retained in the cavity 295 to flow through the second openings 300 (see FIG. 8B).

Figure 8C:
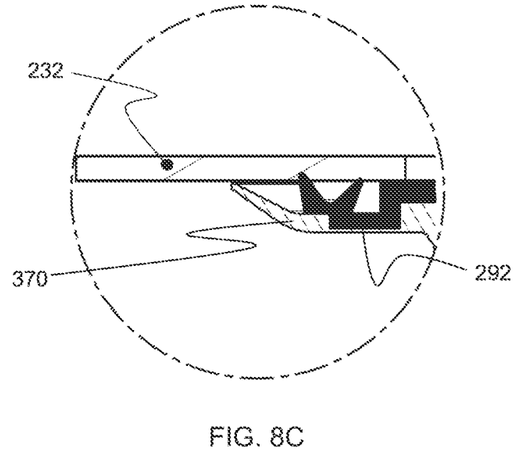

Referring now to the close-up illustration in FIG. 8C a cover member 370 may be provided at the upper end 260 of the body, (e.g. in form of a skirt or "umbrella") that is adapted to cooperate with the bayonet coupling 400 (see FIG. 9) so as to form an encased space for a first seal member 292 when the valve 250 is attachingly engaged with the panel 232. When in use, the cover member 370 is configured to protect the first seal member 292 e.g. from splashing water, dirt or other debris. In the example embodiment shown in FIGS. 8A-8C, the first and second seal members 292, 310 are integral parts made from the same material (e.g. silicone or any other suitable elastomer) or at least connected to each other (and made from the same or different materials). However, first and second seal member 292, 310 may also be separate members, either made from the same or different material(s). Each one of the first and second seal member 292, 310 has two-lipped contact portions (i.e. seal portions), but any other suitable contact portion may be used to form a fluid seal between respective panel 232 and first part 255, and second part 305 and first part 255.

As already described for the previous example embodiments of valve 50 and 150, as coolant through the first openings 290 of the drain valve 250 and accumulate within the cavity 295 as the second openings 300 are sealed due to the second part 305 compressing against second seal member 310. Once the coolant reaches a critical level, it will contact the deformable disc 320 and begin to dissolve the disc 320. As the disc 320 dissolves, it will lose structural integrity and soften as the material making up the disc 320 dissolves into the coolant. As the disc 320 at least partially dissolves, it will have a diminishing profile which provides less resistance to the compressive force exerted by the compression spring 315.

When the disc 320 has been degraded sufficiently such that it is unable to resist the compressive force of the compression spring 315, the compression spring 315 can move the second part 305 towards the upper end 260 and out of engagement with the second seal member 310, which opens the second openings 300 of the first part 255. The coolant liquid is thus able to drain away and the risk of damaging any liquid-sensitive components within the housing are reduced.

Figure 9:
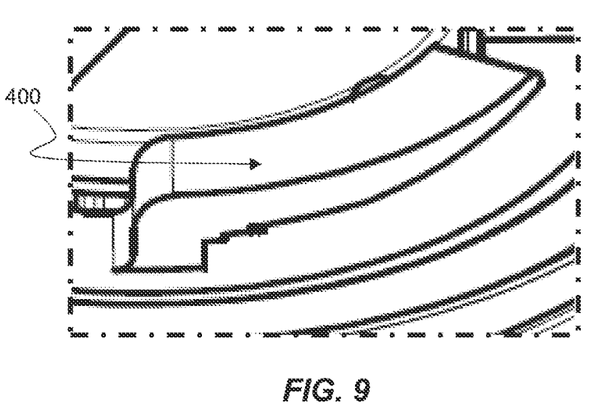
FIG. 9 illustrates a "close-up" view of a suitable bayonet design for a bayonet coupling of the alternative drain valve of FIGS. 7A-7B and 8A-8C.

FIG. 9 shows an example of a bayonet coupling that may be used to attach the drain valve 50, 150, 250 to the panel 12, 32, 232 and/or secure the cap 280 to the body. However, it is understood by the person skilled in the art that any other suitable design may be used.

While the present valve assemblies 50,150 have been described in relation to an electric vehicle battery pack, it would be apparent that the valve assemblies are relevant to any housing where automatic draining of accumulating fluid would be desirable. In some cases, the housing 10, 30 may comprise an aluminium panel for receiving a drain valve 50, 150 of the present disclosure.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A valve assembly comprising:
    a first part mountable to a fluid port of a panel and comprising a first opening for allowing ingress of fluid into the first part from a first side of the panel, and a second opening for allowing egress of fluid out of the first part through the fluid port to a second side of the panel;
    a second part disposed within the first part and configured to seal the second opening when in a first position within the first part,
    a deformable member disposed within the first part, and
    a resilient member biased to move the second part to a second position within the first part, so as to provide a fluid flow path from the first opening to the second opening,
    wherein, when in an initial state, the deformable member is arranged to retain the second part in the first position, and
    wherein, upon contacting a liquid within the first part, at least a portion of the deformable member is configured to deform so as to enable the resilient member to move the second part to the second position;
    wherein the deformable member is disposed between the first part and the second part, and wherein the resilient member is biased to move the second part towards the deformable member.

2. A valve assembly according to claim 1, wherein the deformable member comprises a synthetic polymer, and/or wherein the deformable member comprises a foam structure.

3. A valve assembly according to claim 1, wherein the first part comprises a fire-retardant cap for receiving the deformable member.

4. A valve assembly according to claim 1, wherein the deformable member is configured to soften or at least partially dissolve upon contacting the liquid.

5. A valve assembly according to claim 1, wherein the first part comprises a bayonet coupling adapted to attachingly engage with the fluid port of the panel.

6. A valve assembly according to claim 5, comprising a first resiliently deformable sealing member, comprising two sealing lips, secured to the first part, and arranged to abut the second side of the panel.

7. A valve assembly according to claim 6, wherein the first resiliently deformable sealing member is operably encased by a cover member configured to protect the first resiliently deformable sealing member from external elements.

8. A valve assembly according to claim 6, comprising a second resiliently deformable sealing member attached to the first part and arranged to abut the second part when the second part is in the first position, so as to seal the second opening of the first part.

9. A valve assembly according to claim 8, wherein the first resiliently deformable sealing member and the second resiliently deformable sealing member are integrally formed with one another.

10. A valve assembly according to claim 6, wherein, in use, the first resiliently deformable sealing member and the bayonet coupling sealingly engage the panel therebetween.

11. A valve assembly according to claim 6, wherein the first part comprises a resiliently deformable arm arranged to engage a lip of the panel on the first side of the panel so as to secure the first part within the fluid port.

12. A valve assembly according to claim 11, wherein, in use, the first resiliently deformable sealing member and the resiliently deformable arm secure the panel therebetween.

13. A housing comprising a panel defining an internal volume and an external volume and having a fluid port formed therein, and a valve assembly according to claim 1 secured within the fluid port.

14. An electrical vehicle battery pack comprising a panel defining an internal volume and an external volume and having a fluid port formed therein, and a valve assembly according to claim 1 secured within the fluid port.

15. A valve assembly according to claim 1, wherein the deformable member is located in a space between a surface portion of the first part and a surface portion of the second part, wherein the surface portion of the second part faces the surface portion of the first part.

16. A valve assembly according to claim 1, wherein the deformable member is located in a space between a surface portion of the first part and a surface portion of the second part, such that upon contacting the liquid deformation of the deformable member permits the surface portion of the second part to move toward the surface portion of the first part.

17. A valve assembly comprising:
- a first part mountable to a fluid port of a panel and comprising a first opening for allowing ingress of fluid into the first part from a first side of the panel, and a second opening for allowing egress of fluid out of the first part through the fluid port to a second side of the panel;
- a second part disposed within the first part and configured to seal the second opening when in a first position within the first part,
- a deformable member disposed within the first part, and
- a resilient member biased to move the second part to a second position within the first part, so as to provide a fluid flow path from the first opening to the second opening,
- wherein, when in an initial state, the deformable member is arranged to retain the second part in the first position, and
- wherein, upon contacting a liquid within the first part, at least a portion of the deformable member is configured to deform so as to enable the resilient member to move the second part to the second position;
- a first resiliently deformable sealing member, comprising two sealing lips, secured to the first part, and arranged to abut the second side of the panel;
- a second resiliently deformable sealing member attached to the first part and arranged to abut the second part when the second part is in the first position, so as to seal the second opening of the first part;
- wherein the first resiliently deformable sealing member and the second resiliently deformable sealing member are integrally formed with one another.

* * * * *